United States Patent

[11] 3,607,004

| [72] | Inventors | Andre Deschamps<br>Chatou;<br>Philippe Renault, Neuilly sur Seine, both of France |
|---|---|---|
| [21] | Appl. No. | 769,402 |
| [22] | Filed | Oct. 21, 1968 |
| [45] | Patented | Sept. 21, 1971 |
| [73] | Assignee | Institute Francais du Petrole, des Carburants et Lubrifiants<br>Rueil-Malmaison (Hauts de Seine), France |

[54] PROCESS FOR REMOVING TRACES OF HYDROGEN SULFIDE CONTAINED IN GASES
6 Claims, No Drawings

[52] U.S. Cl. .................................................. 23/2 R,
23/152, 23/225 R
[51] Int. Cl. ..................................................... B01d 53/16
[50] Field of Search ........................................... 23/2, 181,
3, 224–225, 152

[56] References Cited
UNITED STATES PATENTS

| 1,034,646 | 8/1912 | Rabenalt ...................... | 23/2 X |
| 1,890,874 | 12/1932 | Weston ........................ | 23/152 |

Primary Examiner—Earl C. Thomas
Attorney—Francis M. Crawford

ABSTRACT: The present invention relates to the elimination of traces of hydrogen sulfide from gases containing same by passing the contaminated gas through a liquid phase containing iodine dissolved in an organic solvent selected from the group consisting of sulfoxides, alkylene glycols, polyalkylene glycols, ethers of alkylene glycols and polyalkylene glycols, esters of alkylene glycols, esters of polyalkylene glycols and liquid aromatic hydrocarbons, said liquid phase containing not substantially more than 10 percent, by weight, of water.

PROCESS FOR REMOVING TRACES OF HYDROGEN SULFIDE CONTAINED IN GASES

This invention relates to a process for removing substantially all traces of hydrogen sulfide ($H_2S$) contained in gases.

Some natural or synthetic gases contain these constituents in too low amounts for justifying a conventional purification by washing with amines or alkanolamines. It is also well-known that, in the case of gases which are richer of impurities, these conventional sweetening treatments result in the lowering of the $H_2S$ and mercaptans content down to some tens or hundreds of parts per million (p.p.m.). These gases thus require in many cases a finishing treatment.

The process of this invention consists of oxidizing, by means of iodine, as a solution in a specified solvent such as defined hereinafter, hydrogen sulfide to sulfur. The iodine solution is thereafter regenerated by means of an appropriate oxidizing agent.

The oxidation of $H_2S$ by means of iodine as an aqueous solution is a well-known reaction, which is used for example for titrating $H_2S$.

However the aqueous solutions of iodine which usually contain the latter in the form of the $KI_3$ complex cannot be used for treating a gaseous effluent since the losses of iodine carried along with the gas would be too high.

Moreover the sulfur produced by oxidation of hydrogen sulfide ($H_2S$) is obtained in a colloidal form and consequently cannot be easily separated; this colloidal sulfur results in the formation of foam in the solution.

Another inconvenience of this gaseous phase method results from the partial carrying away of hydroiodic acid (HI) formed during the oxidation of $H_2S$ to sulfur.

Thus if the known purification process is used, in the liquid phase, while operating over a rather long period comprising several reaction and regeneration cycles (as in industrial operation), there is observed a substantial iodine consumption.

It has now been observed, that the oxidation of $H_2S$ by iodine as well as the regeneration of reduced iodine by means of an oxidizing agent may be carried out in the hereafter-mentioned solvents, these two operations being very rapid and not resulting in any substantial loss of iodine. Such a process provides for a complete removal, by mere washing, of $H_2S$ traces in a gas under any pressure, for example under a pressure of 0.1 to 10 kg./cm.$^2$, at a temperature comprised for example between 10 and 80° C. and preferably between 20 and 40° C., without contamination of the gas or substantial loss if iodine.

The fact that iodine is not carried along is probably due to an association between iodine and the solvent, which does not take place with water. This association is rather unstable, however, so that iodine retains its reactivity with respect to $H_2S$.

Amongst the solvents which may be used according to this invention, the three following types are to be mentioned:

1. Alkyl-, cycloalkyl- and arylsulfoxides, for example those corresponding to the formula:

$$R_1-SO-R_2$$

wherein $R_1$ and $R_2$ radicals which may be identical to or different from each other, are monovalent hydrocarbon radicals, for example alkyl radicals of 1–20 and preferably 1–3 carbon atoms, cycloalkyl radicals of 3–20 carbon atoms or aryl radicals of 6–20 carbon atoms. $R_1$ and $R_2$ may also be linked together in an alkylene radical preferably containing 4–12 carbon atoms, forming a ring with the sulfur atom.

By way of nonlimitative examples, there will be mentioned: dimethylsulfoxide, diethylsulfoxide, dipropylsulfoxide, dibutylsulfoxide, methylethylsulfoxide, dicyclohexylsulfoxide, methyl-cyclohexylsulfoxide, diphenylsulfoxide, ethyl-phenyl-sulfoxide, cyclohexyl-phenyl sulfoxide, tetramethylenesulfoxide.

Dimethylsulfoxide will be preferred in this first class of solvents.

2. Glycols, polyethyleneglycols, polyalkyleneglycols, ethers and/or esters of glycols or polyalkyleneglycols, for example the compounds of the following formula:

$$R_3-O-[-A-O-]_m R_4$$

in which:

A is a branched or unbranched alkylene radical, containing for example 2–15 and preferably 2–5 carbon atoms.

$R_3$ and $R_4$, identical to or different from each other, are selected from the group comprising the hydrogen atom, the monovalent hydrocarbon radicals having for example 1–20 and preferably 1–5 carbon atoms, for example the alkyl, cycloalkyl or aryl radicals, and the acyl groups R' CO–where R' is selected from the same group as $R_3$ or $R_4$ with the exception of acyl.

$m$ is an integer, for example in the range of from 1 to 20 and preferably 1 to 10.

As nonlimitative examples, are to be mentioned ethylene glycol, diethylene glycol, heptaethylene glycol, decaethylene glycol, propylene glycol (1,3) heptapropyleneglycol (1,3), tetrabutylene glycol (1,4), polyethylene glycol having a molecular weight of about 400, triethylene glycol monomethylether, heptaethylene glycol diethylether, ethyleneglycol monobutylether monoacetate, tripropylene glycol (1,3monophenylether).

The polyethylene glycols and the polyethylene glycol monoalkyl ethers are, however, preferred.

A mixture of several of these compounds may also be used.

Amongst these solvents, those of the second type and more particularly polyalkylene glycols and polyalkylene glycol monoalkylethers are preferred.

These solvents or mixtures of solvents will contain preferably less than 10 percent by weight of water with respect to the mixture solvent + water.

The solvents according to this invention may contain various amounts of iodine, these amounts being dependent, in particular, on the feed rate of the gas, and the content of sulfurous impurities therein.

As a normal rule, there will be used solutions containing from 0.01 to 15 percent and preferably from 0.1 to 1 percent by weight of iodine, these values being not limitative.

In the practice of the invention, any known suitable apparatus may be used for contacting the iodine organic solution with the impure gas, for example columns provided with plates or packing.

The regeneration of the used iodine solution may be carried out in any known manner, for example:

reaction with hydrogen peroxide or sodium hypochlorite
bubbling of ozonized air
electrolytic oxidation
catalytic oxidation
Other means may also be used.

For the regeneration of iodine, such oxidizers as sodium hypochlorite will be preferably used only when the solvent for iodine is immiscible (or partly miscible) with water (for example an aromatic hydrocarbon) in order to avoid any accumulation in the solvent of such a salt as NaCl.

Hydrogen peroxide and air, on the contrary, may be used, irrespective of the miscibility or immiscibility of the solvent in water.

The following examples are illustrative of these embodiments. On a larger scale, the purification would be carried out in conventional industrial absorbers, the absorption of hydrogen sulfide and the regeneration of the iodine solution being carried out continuously, successively or even simultaneously.

EXAMPLE 1

400 cc. of a 0.03 N solution of iodine in triethylene glycol monoethylether containing 5 percent of water are introduced into a glass column of 1 meter height and 4.5 cm. diameter, fitted with perforated plates (the holes have 3 mm. and the perforated surface amounts to 23 percent of the total plate surface, at a temperature of 20° C. The treated gas, consisting of nitrogen containing 0.01 percent of $H_2S$ by volume, is bubbled at a rate of 1 m.$^3$ per hour through the said 400 cc. solution. Crystallized sulfur is formed and separates easily from the solvent. At the outlet of the column, the gaseous outflow does not contain any trace of $H_2S$, iodine or hydroiodic acid. After about 1 hour, traces of $H_2S$ may be observed at the outlet of the apparatus. 1 cc. of an aqueous solution of hydrogen peroxide at a 55 volumes concentration is then added. The mixture recovers its initial red color and may be used again to treat 1 $m.^3$ of impure gas.

This device has been operated over more than 50 complete cycles (purification and regeneration) without noticable loss of iodine. Only sulfur was separated from time to time. The water resulting from the reaction (in very low amount since the concentration of $H_2S$ in the gas is also very low) and the water introduced during the regeneration step (1 cc. per hour in the form of $H_2O_2$), are eliminated in a vapor state from the gaseous outflow. It can be observed that the water concentration in the liquid phase is kept at about 5 percent.

EXAMPLE 1A

This example is only given by way of comparison and forms no part of this invention (as well as example 1B).

Example 1 is repeated, except that 400 cc. of a 0.03 N aqueous solution of iodine are used. Colloidal sulfur is formed in the solution, which tends to foam considerably.

At the outlet of the column, the gaseous outflow does not contain any $H_2S$ but still has a 0.01 percent molar content of iodine (substantial violet coloration). After one hour, traces of $H_2S$ appear in the gaseous outflow. 1 cc. of an aqueous solution of $H_2O_2$ with a 55 volumes concentration is then added. The mixture recovers only partly its initial red color. A iodine titration shows that about one-half of the initial iodine has disappeared.

EXAMPLE 1B

Example 1 is repeated, with the use of a mixture by equal weights of water and triethyleneglycol monoethylether as solvent for iodine; also in this case iodine is carried along with the gaseous effluent of the column.

EXAMPLE 2

A column of 70 cm. height and 2.5 cm. diameter, without packing, is filled up with 60 cc. of a 0.05 N solution of iodine in anhydrous dimethylsulfoxide at 25° C. 120 liters per hour of nitrogen containing 0.08 percent by volume of $H_2S$ are passed therethrough and completely purified. The gaseous outflow contains no iodine. After 20 minutes, the solution has been discolored; a small amount of $H_2O_2$ is then added which regenerated iodine and restores the initial activity of the solution.

EXAMPLE 3

The previous example is repeated with the use of another solvent: ethylene glycol monobutylether monoacetate which forms 2 phases with aqueous solution. In that case the regeneration is achieved by admixing the used organic solution with an aqueous sodium hypochlorite solution.

Thus with 60 cc. of a 0.05 N iodine solution in ethylene glycol monobutylether monoacetate, there may be treated 30 liters of a gaseous mixture containing by volume 30 percent of $CO_2$, 69.9 percent of nitrogen and 0.1 percent of $H_2S$.

EXAMPLE 4

Example 2 is repeated, with the use of 60 cc. of a 0.05 N iodine solution in polyethyleneglycol having a molecular weight of about 400. The same results as in example 2 are obtained.

EXAMPLE 5

Example 20 is repeated with the use of 60 CC. of a 0.05 No $H_2S$ or iodine can be detected in the gaseous outflow. After 20 minutes the solution discolors. Iodine is then regenerated by means of sodium hypochlorite and the purification of gas is taken again.

EXAMPLES 6 to 8

Example 1 is repeated, replacing triethyleneglycol monoethylether by the corresponding amount of the following solvents:
diethyleneglycol (example 6)
tripropyleneglycol (1,3) (example 7)
tetrabutyleneglycol (1,4) monobutylether (example 8)
The results are substantially the same as in example 1.

This invention is particularly useful for treating gases containing low amounts of $H_2S$ (for example 0.001 to 1 percent by volume); however it may also be used with equal success for the treatment of gases having a higher $H_2S$ content, for example of 20 percent by volume. The presence of such gases as $CO_2$, $N_2$, $CH_4$, which are substantially inert towards iodine, is not detrimental to the carrying out of the invention.

We claim:

1. A process for eliminating traces of hydrogen sulfide in a gas, comprising passing said hydrogen sulfide-containing gas through a liquid phase consisting essentially of iodine dissolved in an organic solvent selected from the group consisting of sulfoxides, the alkylene glycols, the polyalkylene glycols, the ethers of alkylene glycols and polyalkylene glycols, and the esters of alkylene glycols and polyalkylene glycols, said liquid phase containing not substantially in excess of 10 percent, by weight, of water.

2. The process of claim 1, wherein the water concentration in said liquid phase is not permitted to exceed about 5 percent, by weight.

3. The process of claim 1, wherein said liquid phase is maintained substantially water-free.

4. The process of claim 1, wherein said liquid phase contains 0.01–15 percent, by weight, of iodine.

5. The process of claim 1, wherein said liquid phase contains 0.1–1.0 percent, by weight, of iodine.

6. The process of claim 1, wherein said liquid phase is maintained at a temperature of 10°–80° C.